(12) United States Patent
Arteaga-King et al.

(10) Patent No.: US 9,698,997 B2
(45) Date of Patent: Jul. 4, 2017

(54) APPARATUS AND METHOD PERTAINING TO THE COMMUNICATION OF INFORMATION REGARDING APPLIANCES THAT UTILIZE DIFFERING COMMUNICATIONS PROTOCOL

(75) Inventors: Alonso Arteaga-King, Bartlett, IL (US); James J. Fitzgibbon, Batavia, IL (US)

(73) Assignee: The Chamberlain Group, Inc., Oak Brook, IL (US)

(*) Notice: Subject to any disclaimer, the term of this patent is extended or adjusted under 35 U.S.C. 154(b) by 924 days.

(21) Appl. No.: 13/324,291

(22) Filed: Dec. 13, 2011

(65) Prior Publication Data

US 2013/0151977 A1 Jun. 13, 2013

(51) Int. Cl.
*G06F 15/16* (2006.01)
*G08C 19/12* (2006.01)
*H04B 3/00* (2006.01)
*H04L 12/28* (2006.01)

(52) U.S. Cl.
CPC ........ *H04L 12/2809* (2013.01); *H04L 12/281* (2013.01)

(58) Field of Classification Search
CPC .. G08C 19/14; H04W 88/022; H04W 88/027; B61L 3/127; B66C 13/40; H04L 29/08072; H04L 29/0809; H04L 29/06; G06F 17/3089; G06Q 10/10; G07C 9/00103; G07C 9/00309; G07C 9/00182; G07C 2009/00793; G07C 2009/00928
USPC ........................................ 709/218
See application file for complete search history.

(56) References Cited

U.S. PATENT DOCUMENTS

| | | | |
|---|---|---|---|
| 6,850 | A | 11/1849 | Pone |
| 2,980,827 | A | 4/1961 | Hill |
| 3,536,836 | A | 10/1970 | Pfeiffer |
| 4,325,146 | A | 4/1982 | Lennington |
| 4,360,801 | A | 11/1982 | Duhame |

(Continued)

FOREIGN PATENT DOCUMENTS

| | | |
|---|---|---|
| AU | 2013254889 | 5/2014 |
| CA | 2831589 | 5/2014 |

(Continued)

OTHER PUBLICATIONS

Examination Report Under Section 18(3) for GB1205649.5 Dated Feb. 12, 2014.

(Continued)

*Primary Examiner* — Mahran Abu Roumi
(74) *Attorney, Agent, or Firm* — Fitch Even Tabin & Flannery LLP (57) ABSTRACT

An end-user device can aggregate information as pertains to a variety of appliances that otherwise utilize incompatible communication protocols to present a shared opportunity to accommodate current information regarding those appliances. This information can include status information regarding such appliances as well as, or in lieu of, instructions to be acted upon by those appliances. Gateways can serve to provide a communications interface between such appliances and, for example, an internet. By one approach one or more middleware platform intermediaries can interface between one or more of those gateways and the end-user device.

21 Claims, 3 Drawing Sheets

(56) References Cited

U.S. PATENT DOCUMENTS

| | | |
|---|---|---|
| 4,408,251 A | 10/1983 | Kaplan |
| 4,464,651 A | 8/1984 | Duhame |
| 4,533,905 A | 8/1985 | Leivenzon |
| 4,573,046 A | 2/1986 | Pinnow |
| 4,583,081 A | 4/1986 | Schmitz |
| 4,629,874 A | 12/1986 | Pugsley |
| 4,821,024 A | 4/1989 | Bayha |
| 4,881,148 A | 11/1989 | Lambropoulos |
| 4,922,224 A | 5/1990 | Drori |
| 4,987,402 A | 1/1991 | Nykerk |
| 5,003,293 A | 3/1991 | Wu |
| 5,047,928 A | 9/1991 | Wiedemer |
| 5,155,680 A | 10/1992 | Wiedemer |
| 5,191,268 A | 3/1993 | Duhame |
| 5,247,440 A | 9/1993 | Capurka |
| 5,255,341 A | 10/1993 | Nakajima |
| 5,278,832 A | 1/1994 | Binzel |
| 5,280,527 A | 1/1994 | Gullman |
| 5,283,549 A | 2/1994 | Mehaffey |
| 5,402,105 A | 3/1995 | Doyle |
| 5,444,440 A | 8/1995 | Heydendahl |
| 5,473,318 A | 12/1995 | Martel |
| 5,475,377 A | 12/1995 | Lee |
| 5,541,585 A | 7/1996 | Duhame |
| 5,565,843 A | 10/1996 | Meyvis |
| 5,565,857 A | 10/1996 | Lee |
| 5,596,840 A | 1/1997 | Teich |
| 5,608,778 A | 3/1997 | Partridge, III |
| 5,656,900 A | 8/1997 | Michel |
| 5,689,236 A | 11/1997 | Kister |
| 5,731,756 A | 3/1998 | Roddy |
| 5,780,987 A | 7/1998 | Fitzgibbon |
| 5,781,107 A | 7/1998 | Ji |
| 5,805,064 A | 9/1998 | Yorkey |
| 5,805,082 A | 9/1998 | Hassett |
| 5,883,579 A | 3/1999 | Schreiner |
| 5,886,634 A | 3/1999 | Muhme |
| 5,917,405 A | 6/1999 | Joao |
| 5,940,000 A | 8/1999 | Dykema |
| 5,969,637 A | 10/1999 | Doppelt |
| 5,990,828 A | 11/1999 | King |
| 6,002,332 A | 12/1999 | King |
| 6,011,468 A | 1/2000 | Lee |
| 6,026,165 A | 2/2000 | Marino |
| 6,028,537 A | 2/2000 | Suman |
| 6,070,361 A | 6/2000 | Paterno |
| 6,127,740 A | 10/2000 | Roddy |
| 6,131,019 A | 10/2000 | King |
| 6,154,544 A | 11/2000 | Farris |
| 6,161,005 A | 12/2000 | Pinzon |
| 6,166,634 A | 12/2000 | Dean |
| 6,184,641 B1 | 2/2001 | Crimmins |
| 6,192,282 B1 | 2/2001 | Smith |
| 6,223,029 B1 | 4/2001 | Stenman |
| 6,225,903 B1 | 5/2001 | Soloway |
| 6,266,540 B1 | 7/2001 | Edgar, III |
| 6,271,765 B1 | 8/2001 | King |
| 6,278,249 B1 | 8/2001 | Fitzgibbon |
| 6,310,548 B1 | 10/2001 | Stephens, Jr. |
| 6,326,754 B1 | 12/2001 | Mullet |
| 6,346,889 B1 | 2/2002 | Moss |
| 6,356,868 B1 | 3/2002 | Yuschik |
| 6,388,559 B1 | 5/2002 | Cohen |
| 6,400,265 B1 | 6/2002 | Saylor |
| 6,404,337 B1 | 6/2002 | Van |
| RE37,784 E | 7/2002 | Fitzgibbon |
| 6,427,913 B1 | 8/2002 | Maloney |
| 6,434,158 B1 | 8/2002 | Harris |
| 6,434,408 B1 | 8/2002 | Heckel |
| 6,448,894 B1 | 9/2002 | Desai |
| 6,476,708 B1 | 11/2002 | Johnson |
| 6,476,732 B1 | 11/2002 | Stephan |
| 6,484,784 B1 | 11/2002 | Weik, III |
| 6,525,645 B2 | 2/2003 | King |
| 6,553,881 B2 | 4/2003 | Marmin |
| 6,561,255 B1 | 5/2003 | Mullet |
| 6,563,430 B1 | 5/2003 | Kemink |
| 6,564,056 B1 | 5/2003 | Fitzgerald |
| 6,597,291 B2 | 7/2003 | Tsui |
| 6,616,034 B2 | 9/2003 | Wu |
| 6,634,408 B2 | 10/2003 | Mays |
| 6,661,340 B2 | 12/2003 | Saylor et al. |
| 6,686,838 B1 | 2/2004 | Rezvani |
| 6,717,528 B1 | 4/2004 | Burleson |
| 6,781,516 B2 | 8/2004 | Reynard |
| 6,782,662 B2 | 8/2004 | McCartney |
| 6,792,083 B2 | 9/2004 | Dams |
| 6,803,851 B1 | 10/2004 | Kramer |
| 6,803,882 B2 | 10/2004 | Hoetzel |
| 6,812,849 B1 | 11/2004 | Ancel |
| 6,822,603 B1 | 11/2004 | Crimmins |
| 6,823,188 B1 | 11/2004 | Stern |
| 6,833,681 B2 | 12/2004 | Fitzgibbon |
| 6,850,163 B1 | 2/2005 | Adamczyk |
| 6,891,838 B1 | 5/2005 | Petite |
| 6,903,650 B2 | 6/2005 | Murray |
| 6,919,790 B2 | 7/2005 | Kanazawa |
| 6,924,727 B2 | 8/2005 | Nagaoka |
| 6,933,843 B1 | 8/2005 | Hom |
| 6,960,998 B2 | 11/2005 | Menard |
| 6,975,202 B1 | 12/2005 | Rodriguez |
| 6,975,226 B2 | 12/2005 | Reynard |
| 6,980,117 B1 | 12/2005 | Kirkland |
| 6,980,131 B1 | 12/2005 | Taylor |
| 6,989,760 B2 | 1/2006 | Dierking |
| 6,998,977 B2 | 2/2006 | Gregori |
| 7,038,409 B1 | 5/2006 | Mullet |
| 7,057,494 B2 | 6/2006 | Fitzgibbon |
| 7,071,813 B2 | 7/2006 | Fitzgibbon |
| 7,071,850 B1 | 7/2006 | Fitzgibbon |
| 7,091,688 B2 | 8/2006 | Gioia |
| 7,124,943 B2 | 10/2006 | Quan |
| 7,127,847 B2 | 10/2006 | Fitzgibbon |
| 7,142,849 B2 | 11/2006 | Neuman |
| 7,158,007 B2 | 1/2007 | Kawamoto |
| 7,161,319 B2 | 1/2007 | Ergun |
| 7,161,466 B2 | 1/2007 | Chuey |
| 7,167,076 B2 | 1/2007 | Wilson |
| 7,170,998 B2 | 1/2007 | McLintock |
| 7,190,266 B2 | 3/2007 | Mullet |
| 7,197,278 B2 | 3/2007 | Harwood |
| 7,205,908 B2 | 4/2007 | Tsui |
| 7,207,142 B2 | 4/2007 | Mullet |
| 7,221,289 B2 | 5/2007 | Hom |
| 7,262,683 B2 | 8/2007 | Maeda |
| 7,266,344 B2 | 9/2007 | Rodriguez |
| 7,269,416 B2 | 9/2007 | Guthrie |
| 7,274,300 B2 | 9/2007 | Duvernell |
| 7,289,014 B2 | 10/2007 | Mullet |
| 7,298,240 B2 | 11/2007 | Lamar |
| 7,306,145 B2 | 12/2007 | Sakai |
| 7,310,043 B2 | 12/2007 | Mamaloukas |
| 7,323,991 B1 | 1/2008 | Eckert |
| 7,331,144 B2 | 2/2008 | Parsadayan |
| 7,332,999 B2 | 2/2008 | Fitzgibbon |
| 7,365,634 B2 | 4/2008 | Brookbank |
| 7,370,074 B2 | 5/2008 | Alexander |
| 7,380,375 B2 | 6/2008 | Maly |
| 7,392,944 B2 | 7/2008 | Sheih |
| 7,424,733 B2 | 9/2008 | Kamiwada |
| 7,446,644 B2 | 11/2008 | Schaffzin |
| 7,464,403 B2 | 12/2008 | Hardman, Jr. |
| 7,468,676 B2 | 12/2008 | Styers |
| 7,471,199 B2 | 12/2008 | Zimmerman |
| 7,482,923 B2 | 1/2009 | Fitzgibbon |
| 7,493,726 B2 | 2/2009 | Fitzgibbon |
| 7,498,936 B2 | 3/2009 | Maeng |
| 7,532,965 B2 | 5/2009 | Robillard |
| 7,561,075 B2 | 7/2009 | Fitzgibbon |
| 7,600,550 B2 | 10/2009 | Mays |
| 7,616,090 B2 | 11/2009 | Baker |
| 7,708,048 B2 | 5/2010 | Mays |
| 7,724,687 B2 | 5/2010 | Autret |
| 7,741,951 B2 | 6/2010 | Fitzgibbon |

(56) References Cited

U.S. PATENT DOCUMENTS

| | | |
|---|---|---|
| 7,750,890 B2 | 7/2010 | Fitzgibbon |
| 7,761,186 B2 | 7/2010 | Keller |
| 7,778,604 B2 | 8/2010 | Bauman |
| 7,783,018 B1 | 8/2010 | Goldberg |
| 7,852,212 B2 | 12/2010 | Fitzgibbon |
| 7,853,221 B2 | 12/2010 | Rodriguez |
| 7,856,558 B2 | 12/2010 | Martin |
| 7,876,218 B2 | 1/2011 | Fitzgibbon |
| 7,983,180 B2 | 7/2011 | Harrington |
| 7,994,896 B2 | 8/2011 | Fitzgibbon |
| 7,995,460 B2 | 8/2011 | Edgar, III |
| 8,014,528 B2 | 9/2011 | Bunte |
| 8,040,217 B2 | 10/2011 | Fitzgibbon |
| 8,063,592 B2 | 11/2011 | Shier |
| 8,144,011 B2 | 3/2012 | Fitzgibbon |
| 8,175,591 B2 | 5/2012 | Fitzgibbon |
| 8,207,818 B2 | 6/2012 | Keller, Jr. |
| 8,239,481 B2 | 8/2012 | Alexander |
| 8,290,515 B2 | 10/2012 | Staton |
| 8,368,509 B2 | 2/2013 | Fitzgibbon |
| 8,416,054 B2 | 4/2013 | Fitzgibbon |
| 8,421,591 B2 | 4/2013 | Karasek |
| 8,423,788 B2 | 4/2013 | Holtzman |
| 8,544,523 B2 | 10/2013 | Mays |
| 8,577,392 B1 | 11/2013 | Pai |
| 8,587,404 B2 | 11/2013 | Laird |
| 8,643,465 B2 | 2/2014 | Fitzgibbon |
| 8,797,138 B2 | 8/2014 | Myers |
| 8,868,220 B2 | 10/2014 | Crucs |
| 9,317,985 B2 | 4/2016 | Tehranchi |
| 9,367,978 B2 | 6/2016 | Sullivan |
| 2001/0011941 A1 | 8/2001 | King |
| 2001/0017483 A1 | 8/2001 | Frohberg |
| 2002/0014954 A1 | 2/2002 | Fitzgibbon |
| 2002/0033760 A1* | 3/2002 | Kobayashi ........ H04L 12/2818 709/218 |
| 2002/0067308 A1 | 6/2002 | Robertson |
| 2002/0162175 A1* | 11/2002 | Berglund ............. D06F 43/00 8/142 |
| 2002/0178385 A1 | 11/2002 | Dent |
| 2002/0180582 A1 | 12/2002 | Nielsen |
| 2002/0180600 A1 | 12/2002 | Kirkland |
| 2002/0183008 A1 | 12/2002 | Menard |
| 2003/0016119 A1 | 1/2003 | Teich |
| 2003/0016139 A1 | 1/2003 | Teich |
| 2003/0018478 A1 | 1/2003 | Mays |
| 2003/0023881 A1 | 1/2003 | Fitzgibbon |
| 2003/0029579 A1 | 2/2003 | Mays |
| 2003/0043021 A1 | 3/2003 | Chung |
| 2003/0097586 A1 | 5/2003 | Mok |
| 2003/0098778 A1 | 5/2003 | Taylor |
| 2003/0118187 A1 | 6/2003 | Fitzgibbon |
| 2003/0151493 A1 | 8/2003 | Straumann |
| 2003/0182132 A1 | 9/2003 | Niemoeller |
| 2003/0193388 A1 | 10/2003 | Ghabra |
| 2003/0216139 A1 | 11/2003 | Olson |
| 2003/0222754 A1 | 12/2003 | Cho |
| 2004/0012481 A1 | 1/2004 | Brusseaux |
| 2004/0012483 A1 | 1/2004 | Mays |
| 2004/0036573 A1 | 2/2004 | Fitzgibbon |
| 2004/0176107 A1 | 9/2004 | Chadha |
| 2004/0212498 A1 | 10/2004 | Peterson |
| 2004/0229569 A1 | 11/2004 | Franz |
| 2004/0239482 A1 | 12/2004 | Fitzgibbon |
| 2004/0257189 A1 | 12/2004 | Chang |
| 2004/0257199 A1 | 12/2004 | Fitzgibbon |
| 2005/0012631 A1 | 1/2005 | Gregori |
| 2005/0030179 A1 | 2/2005 | Script |
| 2005/0033641 A1 | 2/2005 | Jha |
| 2005/0035873 A1 | 2/2005 | Kimura |
| 2005/0044906 A1 | 3/2005 | Spielman |
| 2005/0076242 A1 | 4/2005 | Breuer |
| 2005/0085248 A1 | 4/2005 | Ballay |
| 2005/0088281 A1 | 4/2005 | Rohrberg |
| 2005/0099299 A1 | 5/2005 | Tyroler |
| 2005/0110639 A1 | 5/2005 | Puzio |
| 2005/0113080 A1 | 5/2005 | Nishimura |
| 2005/0134426 A1 | 6/2005 | Mullet |
| 2005/0146417 A1 | 7/2005 | Sweatte |
| 2005/0170777 A1 | 8/2005 | Harwood |
| 2005/0174250 A1 | 8/2005 | Dierking |
| 2005/0195066 A1 | 9/2005 | Vandrunen |
| 2005/0206497 A1 | 9/2005 | Tsui |
| 2005/0242923 A1 | 11/2005 | Pearson |
| 2005/0245233 A1 | 11/2005 | Anderson |
| 2005/0258937 A1 | 11/2005 | Neuwirth |
| 2005/0272372 A1 | 12/2005 | Rodriguez |
| 2005/0273372 A1 | 12/2005 | Bowne |
| 2006/0038656 A1 | 2/2006 | Wilson |
| 2006/0056663 A1 | 3/2006 | Call |
| 2006/0077035 A1 | 4/2006 | Mamaloukas |
| 2006/0091998 A1 | 5/2006 | Fitzgibbon |
| 2006/0103503 A1 | 5/2006 | Rodriquez |
| 2006/0132284 A1 | 6/2006 | Murphy |
| 2006/0137261 A1 | 6/2006 | Maly |
| 2006/0145811 A1 | 7/2006 | Nantz |
| 2006/0147052 A1 | 7/2006 | Wikel |
| 2006/0153122 A1 | 7/2006 | Hinman |
| 2006/0158344 A1 | 7/2006 | Bambini |
| 2006/0164208 A1 | 7/2006 | Schaffzin |
| 2006/0170533 A1 | 8/2006 | Chioiu |
| 2006/0187034 A1 | 8/2006 | Styers |
| 2006/0214783 A1 | 9/2006 | Ratnakar |
| 2006/0220785 A1 | 10/2006 | Ferdman |
| 2006/0223518 A1 | 10/2006 | Haney |
| 2006/0261932 A1 | 11/2006 | Ando |
| 2006/0279399 A1 | 12/2006 | Chuey |
| 2006/0281008 A1 | 12/2006 | Mitani |
| 2007/0005605 A1 | 1/2007 | Hampton |
| 2007/0005806 A1 | 1/2007 | Fitzgibbon |
| 2007/0028339 A1 | 2/2007 | Carlson |
| 2007/0046428 A1 | 3/2007 | Mamaloukas |
| 2007/0058811 A1 | 3/2007 | Fitzgibbon |
| 2007/0116194 A1 | 5/2007 | Agapi |
| 2007/0146118 A1 | 6/2007 | Rodriguez |
| 2007/0159301 A1 | 7/2007 | Hirt |
| 2007/0171046 A1 | 7/2007 | Diem |
| 2007/0177740 A1 | 8/2007 | Nakajima |
| 2007/0183597 A1 | 8/2007 | Bellwood |
| 2007/0185597 A1 | 8/2007 | Bejean |
| 2007/0290792 A1 | 12/2007 | Tsuchimochi |
| 2008/0061926 A1 | 3/2008 | Strait |
| 2008/0092443 A1 | 4/2008 | Herman |
| 2008/0106370 A1 | 5/2008 | Perez |
| 2008/0108301 A1 | 5/2008 | Dorenbosch |
| 2008/0130791 A1 | 6/2008 | Fitzgibbon |
| 2008/0132220 A1 | 6/2008 | Fitzgibbon |
| 2008/0224886 A1* | 9/2008 | Rodriguez ......... G07C 9/00182 340/13.28 |
| 2008/0303706 A1 | 12/2008 | Keller |
| 2009/0005080 A1 | 1/2009 | Forstall |
| 2009/0063293 A1 | 3/2009 | Mirrashidi |
| 2009/0064056 A1 | 3/2009 | Anderson |
| 2009/0102651 A1 | 4/2009 | Fitzgibbon |
| 2009/0160637 A1 | 6/2009 | Maeng |
| 2009/0273438 A1 | 11/2009 | Sultan |
| 2009/0302997 A1 | 12/2009 | Bronstein |
| 2009/0315751 A1 | 12/2009 | Bennie |
| 2010/0120450 A1 | 5/2010 | Herz |
| 2010/0141381 A1 | 6/2010 | Bliding |
| 2010/0141514 A1 | 6/2010 | Bell |
| 2010/0242360 A1 | 9/2010 | Dyas |
| 2010/0242369 A1 | 9/2010 | Laird |
| 2010/0289661 A1 | 11/2010 | Styers |
| 2010/0297941 A1 | 11/2010 | Doan |
| 2010/0299517 A1 | 11/2010 | Jukic |
| 2011/0025456 A1 | 2/2011 | Bos |
| 2011/0032073 A1 | 2/2011 | Mullet |
| 2011/0055909 A1 | 3/2011 | Dowlatkhah |
| 2011/0084798 A1 | 4/2011 | Fitzgibbon |
| 2011/0109426 A1 | 5/2011 | Harel |
| 2011/0130134 A1 | 6/2011 | VanRysselberghe |
| 2011/0193700 A1 | 8/2011 | Fitzgibbon |
| 2011/0205013 A1 | 8/2011 | Karasek |

(56) References Cited

U.S. PATENT DOCUMENTS

| | | |
|---|---|---|
| 2011/0234367 A1 | 9/2011 | Murphy |
| 2011/0254685 A1 | 10/2011 | Karasek |
| 2011/0258076 A1 | 10/2011 | Muirbrook |
| 2011/0311052 A1 | 12/2011 | Myers |
| 2011/0316667 A1 | 12/2011 | Tran |
| 2012/0098638 A1 | 4/2012 | Crawford |
| 2012/0188054 A1 | 7/2012 | Bongard |
| 2012/0249289 A1 | 10/2012 | Freese |
| 2012/0280783 A1 | 11/2012 | Gerhardt |
| 2012/0280789 A1 | 11/2012 | Gerhardt |
| 2012/0280790 A1 | 11/2012 | Gerhardt |
| 2013/0017812 A1 | 1/2013 | Foster |
| 2013/0057695 A1 | 3/2013 | Huisking |
| 2013/0060357 A1 | 3/2013 | Li |
| 2013/0060358 A1 | 3/2013 | Li |
| 2013/0093563 A1 | 4/2013 | Adolfsson |
| 2013/0147600 A1 | 6/2013 | Murray |
| 2013/0257589 A1 | 10/2013 | Mohiuddin |
| 2013/0290191 A1 | 10/2013 | Dischamp |
| 2013/0328663 A1 | 12/2013 | Ordaz |
| 2014/0021087 A1 | 1/2014 | Adler |
| 2014/0125499 A1 | 5/2014 | Cate |
| 2014/0184393 A1 | 7/2014 | Witkowski |
| 2014/0253285 A1 | 9/2014 | Menzel |
| 2014/0266573 A1 | 9/2014 | Sullivan |
| 2015/0221147 A1 | 8/2015 | Daniel-Wayman |
| 2016/0010382 A1 | 1/2016 | Cate |

FOREIGN PATENT DOCUMENTS

| | | |
|---|---|---|
| DE | 19801119 C1 | 9/1999 |
| EP | 0422190 | 10/1990 |
| EP | 846991 | 6/1998 |
| EP | 0913979 A2 | 5/1999 |
| EP | 1151598 | 6/2000 |
| EP | 1227027 | 7/2002 |
| GB | 2404765 | 2/2005 |
| JP | 2002019548 | 1/2002 |
| JP | 2004088774 | 3/2004 |
| JP | 4864457 | 2/2012 |
| KR | 2002032461 | 5/2002 |
| WO | 9012411 | 10/1990 |
| WO | 9515663 A1 | 6/1995 |
| WO | 9923614 | 5/1999 |
| WO | 0036812 | 6/2000 |
| WO | 0193220 | 12/2001 |
| WO | 02075542 | 9/2002 |
| WO | 2009088901 | 7/2009 |
| WO | 2011055128 | 5/2011 |

OTHER PUBLICATIONS

Canadian Patent Application No. 2,533,795; Second Office Action Dated Dec. 30, 2013.

Bill Peisel; "Designing the Next Step in Internet Applicances" Electronic Design/Mar. 23, 1998.

Examination Report Dated Apr. 3, 2012 issuing from New Zealand Patent Application No. 599055.

George Lawton; "Dawn of the Internet Appliance" Computer, Industry Trends; Oct. 1, 1997.

Hassan A. Artail; "A Distributed System of Network-Enabled Microcontrollers for Controlling and Monitoring Home Devices" IEEE 2002.

Ian Bryant and Bill Rose; "Home Systems: Home Controls;" p. 1-322; © 2001 Parks Associates.

K.K. Tan, Y.L. Lim and H.L. Goh; "Remote Adaptive Control and Monitoring" IEEE (c) 2002.

Kurt Scherf, Michael Greeson and Tricia Parks; "Primary Perspectives: "E-Enabled" Home Security;" pp. 1-87; © 2003 Parks Associates.

Peter M. Corcoran and Joe Desbonnet; "Browser-Style Interfaces to a Home Automation Network" Manuscript received Jun. 18, 1997, IEEE (c) 1997.

Summary of Findings From Parks Associates\ Early Reports; pp. 9-13; Apr. 15, 2013 by Parks Associates.

Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.

4Sight Internet Brochure; http://4sightsolution.4frontes.com/document/4CB-4S00-0809; Carrollton, TX; 2009; 5 pgs.

828LM—LiftMaster Internet Gateway; http://www.liftmastercom/consumerweb/pages/accessoriesmodeldetaiLaspx? modelId=2407; printed Oct. 30, 2012.

Automatic Garage Door Closer Manual—Protectrix 18A—Dated Mar. 31, 2009.

Combined Search and Examination Report Cited in British Patent Application No. GB1025649.5 Dated Aug. 8, 2012.

Examination Report from New Zealand Patent Application No. 599055 dated Apr. 3, 2012.

Examination Report Under Section 18(3) Cited in British Patent Application No. GB1205649.5 Dated May 29, 2013.

Infinias Mobile Credential App for Android DroidMill; Known and printed as early as Dec. 19, 2011; http://droidmill.com/infinias-mobile-credential-1364120.html.

Intelli-M eIDC32; Ethernet-Enabled Integrated Door Controller; www.infinias.com; Known and printed as early as Dec. 19, 2011.

Internet Connected Garage Door Opener; Open New Doors at Sears; http://www.sears.corri/shc/s/p__10153__12605__00930437000P?prdNo=1&blockNo=1&blockType=G1; printed Oct. 30, 2012.

LiftMaster; MyQ Enabled Accessory: LiftMaster Internet Gateway (Model 828); Known as of Dec. 19, 2011.

LiftMaster Internet Gateway: Your Simple Solution to Home Control; http://www.liftmaster.com/consumerweb/products/IntroducingLiftMasterInternetGateway, printed Oct. 30, 2012.

Protectrix Wireless automatic Garage Door Closer Timer Opener Security Accessory; http://www.closethegarage.com; printed Oct. 30, 2012.

Stephen Shankland; "Need to lend your key? E-Mail it, Frauhofer says" news.cnet.com/8301-1035__3-57572338-94/need-to-lend-your-key-e-mail-it-fraunhofer-says/; pp. 1-5; CNET News, Mar. 4, 2013.

The Intelli-M eIDC32; True IP Access Control; htto://www.infinias.com/main/Products/eIDCController.aspx; Known and printed as early as Dec. 19, 2011.

ULStandard for Safety for Door, Drapery, Gate, Louver, and Window Operators and Systems, UL 325 Fifth Edition, Dated Jun. 7, 2002; pp. 1-186.

Wayne-Dalton Press Area—New Z-Wave enabled prodrive; http://www.wayne-dalton.com/newsitem98.asp; Printed Oct. 13, 2011.

www.brinkshomesecurity.com/home-security-systems-and-pricing/security-equipment/security-equipment.htm as printed on Feb. 11, 2009.

Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.

"Now You Can Close Your Garage Door With a Smartphone;" Copyright 2011 USA Today; http://content.usatoday.com/communities/driveon/post/2011/09/now-you-can-control-your-garage-door-from-your-smartphone.

ActieHome PC Home Automation System; http://www.x10.com/promotions/sw31a__activehome__hmp.html?WENTY11; accessed Sep. 2011.

Arrayent; White Paper: Six System Requirements for an Internet-Connected Product Line; Copyright 2010; http://arrayent.com/pdfs/SixSystemRequirementsforInternetConnectedProductsLine.pdf.

EZSrve-Insteon/X10 Home Automation Gateway—Model #5010L; http://www.simplehomenet.com/proddetail.asp?prod+9357342317, accessed Sep. 2011.

Fully-Loaded ActiveHome Pro PC Hom Automation System; http://www.x10.com/promotions/cm15a__loaded__ps.html; accessed Sep. 2011.

Hawking Technologies HomeRemote Wireless Home Automation Gateway Pro Starter Kit; The HRGZ2 HomeRemote Gateway;

(56) References Cited

OTHER PUBLICATIONS

Smart Home Systems, Inc.; http://www.smarthomeusa.com/ShopByManufacturer/Hawking-Technologies/Item/HRPS1/; Accessed Sep. 2011.

HomeRemote Wireless Home Automation Gateway—PracticallyNetworked.com; Review date Aug. 2007; http://222.practicallynetworked.com/review.asp?pid=690; Accessed Sep. 2011.

HomeSeer HS2—Home Automation Software; http://store.homeseer.com/store/HomeSeer-HS2-Home-Automation-Software-Download-P103.aspx; Accessed Sep. 2011.

How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.

Kenmore Connect; http:/www.kenmore.com/shc/s/dap_10154_12604_DAP_Kenmore+Connect 2010 Sears Brands, LLC.

Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.

MiCasa Verde.com—Vers2; http://www.micasaverde.com/vera.php; Accessed Sep. 2011.

Miele's Remote Vision Explained; http://www.miclensa.com/service/remote_vision/verify.aspx; Accessed Feb. 2012.

Press Release; Kenmore Uneils Reolutionary Technology Enabling Laundry Applicances to 'Talk' to Customer Serice Experts; PR Newswire, pNA, Aug. 4, 2010.

Somfy's Slick Tahoma Z-Wire and RTS Home Automatation Gateway; Thomas Ricker; posted Janaury 4, 2011; http://www.engadget.com/2011/01/04/softys-tahoma-z-wave-and-rts-home-automation-gateway/.

The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.

Universal Devices—ISY-99i Series; http://www.universal-devices.com/99i.htm; Accessed Sep. 2011.

Examination Report Under Section 18(3) for GB1205649.5 Dated Jun. 11, 2014.

4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.

6POWER, IPv6 and PLC for home automation; Terena 2004; Jordi Palet & Francisco Ortiz.

Authentication vs. Encryption; Be in Control with Control Networks; Feb. 10, 2004; http://www.buildings.com/DesktcpModulesIBB ArlicleMaxfArticleDeta l/BBArticleDetai l Printaspx7ArlicleID=1740& Template=standm-d_Pri nt.ascx &siteID= 1.

Big blue builds home network technology; McCune, Heather; http://search.proquest.com/docview/194229104?accountid=12492; Apr. 2003.

Controlling the Status Indicator Module of the Stanley Garage Door Opener Set; Rene Braeckman; Apr. 6, 2000.

Defendant Invalidity Contentions regarding U.S. Pat. No. 6,998,977, Exhibit 16, Apr. 20, 2015.

Defendant Invalidity Contentions regarding U.S. Pat. No. 7,482,923, Exhibit 20, Apr. 20, 2015.

Defendant Invalidity Contentions regarding U.S. Pat. No. 7,852,212, Exhibit 18, Apr. 20, 2015.

Defendant Invalidity Contentions regarding U.S. Pat. No. 7,876,218, Exhibit 19, Apr. 20, 2015.

Defendant Invalidity Contentions regarding U.S. Pat. No. 8,144,011, Exhibit 17, Apr. 20, 2015.

Detroit Free Press Home Computing Column; Detroit Free; Newman, Heather; http ://search.proquest.com/docview/4632707 4 7?accountid=12492; Knight Ridder/Tribune Business News; © 2002, last updated Dec. 13, 2011.

Diomidis D. Spinellis; The information furnace: consolidated home control; © Springer-Verlag London Limited 2003.

Doug Olenick; Motorola Broadens Home Automation Line; http ://search.proquest.com/docview/232255560?accountid=12492; vol. 20, © Jan. 6, 2005; last updated Sep. 1, 2011.

International Conference on Sensors and Control Techniques (IeSC 2000); Desheng Jiang, Anbo Wang, Fume and Temperature Alarm and Intelligent Control System of the District for Fire-Proof, Jun. 19-21, 2000, Wuhan, China, vol. 4077.

Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauldin Covington; Barrons; Mar. 17, 2015.

Net2 User Manual; Version 3; Paxton Access; "Date code: 281002".

New Zealand Application No. 706180; First Examination Report Dated Apr. 10, 2015.

Secure Smart Homes using• Jini and UIUC SESAME; Jalal Al-Muhtadi et al.; 1063-9527/00 © 2000 IEEE.

Security System Installation Manual; Caretaker and Custom Versions; Interactive Technologies, Inc.; Issue Date May 5, 1994.

Security System Installation Manual; Caretaker and Custom Versions; Interactive Technologies, Inc.; Text No. 46-908-01 Rev. A; 1995.

Smart Networks for Control; Reza S. Raji;IEEE Spectrum Jun. 1994.

Svein Anders Tunheim; Wireless Home Automation Systems Require Low Cost and Low Power RF-IC Solutions; Wireless Home Automation Systems (rev. 1.0) May 16, 2002; p. 1 of 8.

The iDorm—a Practical Deployment of Grid Technology; Anthony Pounds—Cornish, Arran Holmes; Intelligent Interactive Environments Group, University of Essex, UK; Proceedings of the 2nd IEEE/ACM International Symposium on Cluster Computing and the Grid (CCGRIO'02) 0-7695-1582-7/02 © 2002 IEEE.

The Information Furnace: Consolidated Home Control; Diomidis D. SpinellisDepartment Management Science and Technology Athens (56) References Cited

OTHER PUBLICATIONS

University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
Xanboo Future Product; http://www.xanboo.com/xanproducts/newproducts.htm Feb. 2002, Xanboo Inc.
XPress Access; Simple Personal Management; © 2001 Andover Controls Corporation BR-XPACCESS-A.
British Combined Search and Examination Report Under Section 17 and 18(3) from British Application No. GB0713690.6 Dated Oct. 17, 2007.
British Search Report Under Section 17 Dated Dec. 20, 2007 for Application No. GB0713690.6.
European Patent Application No. EP 1 280 109 A3; European Search Report Dated: Aug. 1, 2005.
International Search Report and Written Opinion for PCT/US2014/057405 Dated Dec. 17, 2014.
James Y. Wilson and Jason A. Kronz; Inside Bluetooth Part II, Dr. Dobb's Portal; The World of Software Development; Dr.Dobb's Journal; Jul. 22, 2001; 9 pages.
Sensory, Inc. RSC-300/364 Data Book, Jan. 2001 (55 pages).
Australian Patent Application No. 2013254889; Examination Report No. 1; Issued: Jan. 13, 2017.

\* cited by examiner

APPARATUS AND METHOD PERTAINING TO THE COMMUNICATION OF INFORMATION REGARDING APPLIANCES THAT UTILIZE DIFFERING COMMUNICATIONS PROTOCOL

TECHNICAL FIELD

This disclosure relates generally to appliances and more particularly to communications to or from appliances.

BACKGROUND

Appliances of various kinds are well known in the prior art. Such appliances tend, in general, to effect any of a wide variety of actions that increase human productivity, safety, comfort, and/or convenience. Increasingly, many appliances have a communications capability to permit the appliance to transmit information (such as status information regarding itself) and/or to receive information (such as instructions to be acted upon).

There exists, however, no accepted universal communications protocol by which all such appliances conduct such communications. Instead, manufacturers make use of any of a variety of available standards (such as, for example X10 and ZigBee) or alternative (sometimes proprietary) approaches that they license or otherwise themselves acquire or devise (such as, for example, Z-Wave and MyQ). As a result, at least some of the various appliances available at a typical modern facility (such as a residence) will utilize incompatible protocols to support their respective inbound or outbound communications.

BRIEF DESCRIPTION OF THE DRAWINGS

The above needs are at least partially met through provision of the apparatus and method pertaining to the communication of information regarding appliances that utilize differing communications protocols described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, at least some of the appliances at a given facility communicate, at least in part, via corresponding gateways. One such gateway may compatibly communicate with more than one such appliance but in many cases the facility will harbor two or more such gateways in order to accommodate the variety of incompatible protocols being employed by these appliances. By one approach these gateways provide access to an internet such as, but not limited to, the Internet.

One or more end-user devices are, in turn, configured to present (via a user interface) a shared opportunity to accommodate current information regarding these appliances notwithstanding that at least some of these appliances communicate using incompatible protocols. By one approach this current information comprises instructions being sourced by the end-user device regarding actions to be taken by a corresponding recipient appliance. By another approach, in lieu of the foregoing or in combination therewith, this current information comprises status information regarding one or more of these appliances.

If desired, one or more middleware platform intermediaries facilitate the communication of such current information. The aforementioned gateways and the end-user device may communicate with this middleware platform intermediary via, for example, the aforementioned internet. By one approach, and by way of example, one or more of these gateways may communicate with a first such middleware platform intermediary while one or more other gateways communicate with a second, different such middleware platform intermediary. So configured, for example, a service provider that sponsors/operates one such middleware platform intermediary can offer one corresponding business arrangement while another service provider that sponsors/operates another such middleware platform intermediary can offer a different corresponding business arrangement to, for example, a user of the aforementioned end-user device.

So configured an end user can review and/or instruct their various appliances in an aggregated and consolidated manner that is transparent with respect to the use of the aforementioned incompatible protocols. This, in turn, can greatly facilitate the end user's use of such a capability. These teachings also provide significant opportunities to leverage the communications capabilities of such appliances. The approaches described herein are also highly scalable and can be successfully employed with a wide variety and number of appliances, communications protocols, gateways, and so forth.

Figure 1:
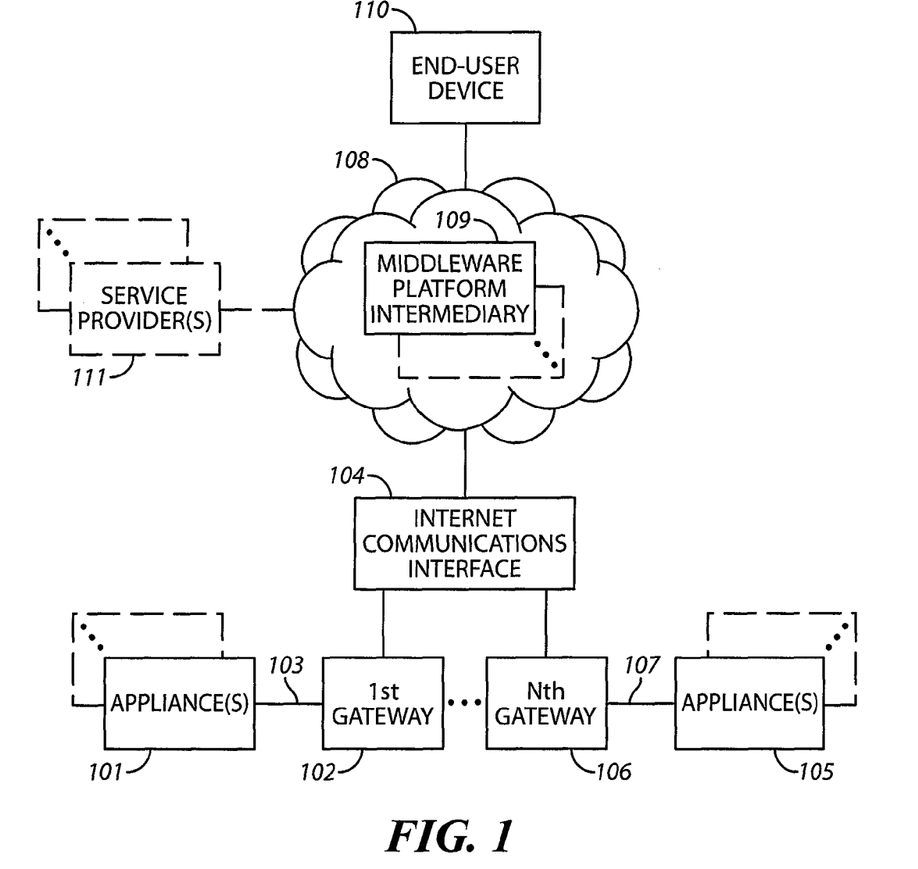
FIG. 1 comprises a block diagram as configured in accordance with various embodiments of the invention.

These and other benefits may become clearer upon making a thorough review and study of the following detailed description. Referring now to the drawings, and in particular to FIG. 1, an illustrative application setting will be described. It will be understood that these teachings are not limited to the specifics of this example which is merely intended to provide a useful context for presenting some useful illustrative, non-limiting examples.

This illustrative example presumes the presence of one or more appliances 101 that are located at a given facility. This facility may comprise, for example, a residential home (such as a single-family dwelling, an apartment, a condominium, and so forth), an office, a commercial or industrial establishment, a retail establishment, and so forth. In many cases the facility will comprise a single building (or a part of a single building) but these teachings are also flexible enough to apply with respect to a multi-building facility. A facility may also include grounds or artifacts other than buildings per se, such as gates and other movable barriers, fences, roads and other pathways, and so forth.

The appliance itself can comprise any of a wide variety of components. Examples include, but are not limited to, remotely-controllable lights, movable-barrier operators (such a garage door openers, gate openers, and so forth) and movable-barrier locks, climate-control systems (such as heaters, air conditioners, humidifiers, de-humidifiers, fans, and so forth), clothes washers, clothes dryers, dishwashers, fireplaces (including gas, wood, pellet, and other hearth-based combustion chambers), cooking stoves and ovens, refrigerators and ice makers, doorbells and entry chimes, alarm systems (including movement-detection systems, intrusion-detection systems, smoke, fire, and combustion detectors, flooding detectors, freezing detectors, moisture detectors, and so forth), pumps of various kinds (including potable water pumps, sewage pumps, sump pumps, and so forth), automated window coverings, swimming pool and hot tub components (such as water-circulation pumps, water heaters, chemical-addition systems, and so forth), entertainment components (such as television and/or radio broadcast receivers, audio and/or video playback systems, and so forth), and so forth.

As noted above, there can be one or more such appliance 101. When there is more than one such appliance 101, the plurality of appliances 101 may all be of a same type of appliance or can be categorically different from one another as desired.

In this illustrative example, these appliances 101 are communicatively coupled to a first gateway 102 via a communication pathway 103. This communication pathway 103 can comprise a wireless and/or a wireline connection as desired. By one approach, for example, this communication pathway 103 can comprise a Wi-Fi connection that relies upon an IEEE 802.11-compatible communication protocol. By another approach, and as yet another example, when the appliance 101 comprises a movable-barrier operator, the communication pathway 103 may comprise a wireless pathway that utilizes a same one-way or bidirectional signaling protocol that the movable-barrier operator would ordinarily utilize to communicate with a remote-control device. Numerous other possibilities exist and these teachings are not particularly constrained in any of these regards.

As a gateway, this first gateway 102 serves, at least in part, to translate as appropriate communications from (or to) these appliances 101 into (or from) another communications protocol; in this illustrative example one of these protocols is the Internet Protocol (IP). IP is the principal communication protocol used for relaying datagrams (packets) across an internet (also sometimes referred to as an internetwork) using the Internet protocol suite. Responsible for routing packets across network boundaries, IP is the primary protocol that establishes the Internet. IP is the primary protocol in the Internet Layer of the Internet protocol suite and serves to deliver datagrams from a source to a destination solely based on their respective addresses. In particular, IP defines addressing methods and structures for datagram encapsulation. Internet Protocol version 4 (IPv4) and, more recently, Internet Protocol version 6 (IPv6) are the dominant versions at present (though the present teachings are no doubt applicable to future versions of IP going forward).

Accordingly, this first gateway 102 serves to receive IP-based communications (via, in this example, an Internet communication interface 104 such as, but not limited to, a cable modem or the like that operably couples to the Internet 108) and translate received message content, as appropriate, into the communications protocol that defines the communications pathway 103 between itself and the appliance(s) 101. This first gateway 102 also performs the opposite functionality by translating message content received from the appliance(s) 101 via the communications pathway 103 and into a form suitable for conveyance via the Internet.

In this illustrative example, this same facility also includes one or more additional appliances 105 that communicatively couple to one or more other gateways (represented here by an Nth gateway 106) via a corresponding communications pathway 107. In this example this communications pathway 107 is communicatively incompatible with the aforementioned communications pathway 103. This incompatibility can be owing to any number of protocol-based causes including, but not limited to, the use of different bearer frequencies, modulation, encryption, and/or signaling requirements and specifications (such as frame specifications, frame order, bit specifications, bit order, and so forth). Accordingly, in a typical application setting, the first gateway 102 cannot communicate compatibly with this later group of appliances 105 nor can the Nth gateway 106 communicate compatibly with the first group of appliances 101. In all cases in this example, however, the gateways 102, 106 are configured to communicate compatibly via the Internet 108.

These teachings will accommodate any of a wide variety of gateways in these regards. This includes, by way of example and not by way of limitation, the ISY-99-family of devices by Universal Devices, the Home Remote Pro Internet Gateway HRPG1, the Liftmaster Internet Gateway 828LM, and numerous others.

Figure 2:
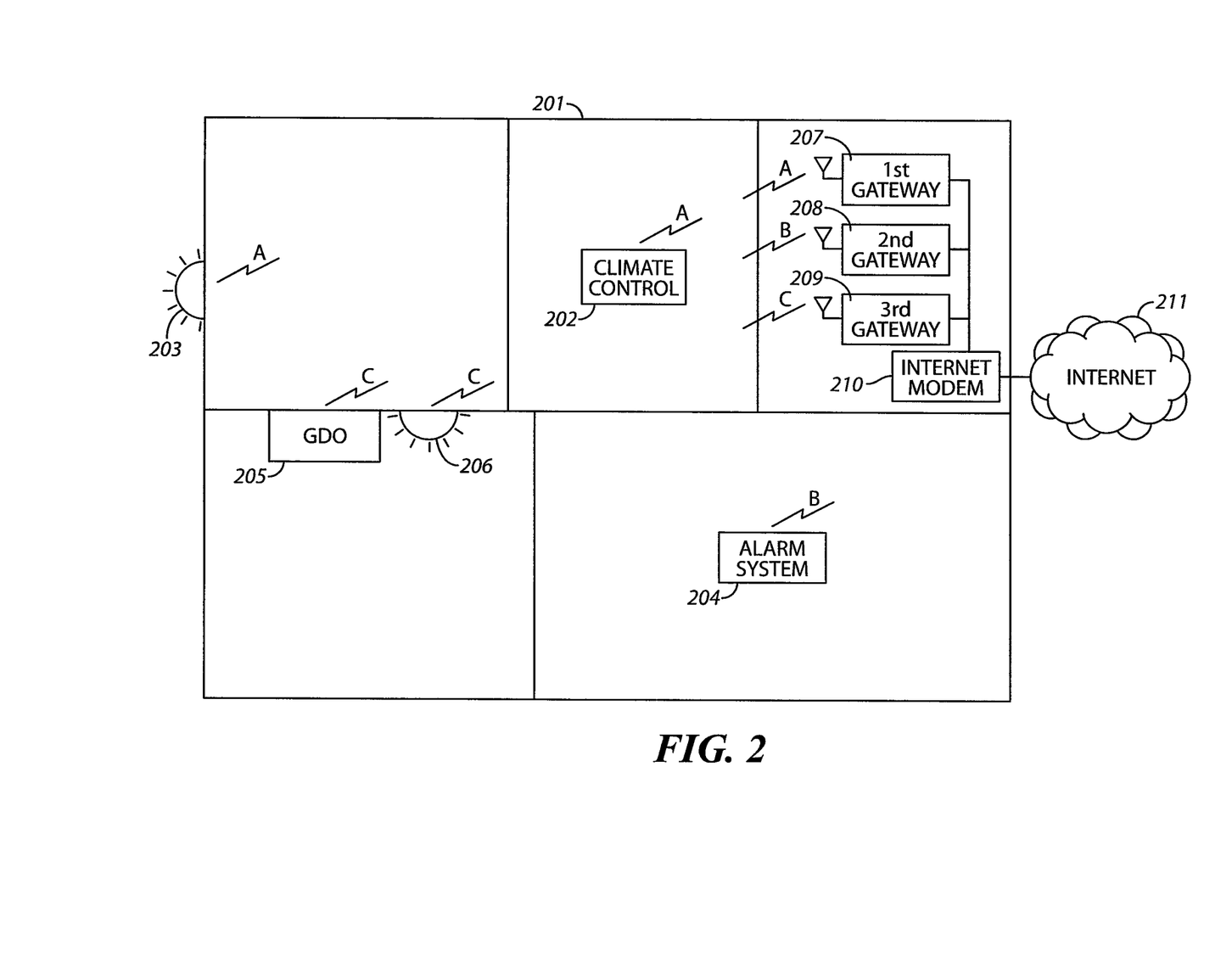
FIG. 2 comprises a schematic representation as configured in accordance with various embodiments of the invention.

Referring momentarily to FIG. 2, a more specific example in these regards will now be discussed. In this example the facility comprises a residence 201 for a single family that includes a plurality of different rooms (including a garage) located on two different floors. The appliances in this example include a climate control system 202 and exterior lighting 203 (that communicate using a first protocol A), an alarm system 204 (that communicates using a second, different protocol B), and a garage-door opener 205 and garage worklight 206 (that communicate using a third, different-still protocol C).

Also in this example, a first gateway 207 communicates with the climate control system 202 and the exterior lighting 203 using protocol A, a second gateway 208 communicates with the alarm system 204 using protocol B, and a third gateway 209 communicates with the garage-door opener 205 and worklight 206 using protocol C. To confirm a point specified above, these three protocols are technically incompatible with one another; as a loose metaphor it is as though one protocol is hand-based sign language, another is spoken Japanese, and the third is written Sanskrit. Each of these gateways 207-209, in turn, communicatively couples to an Internet modem 201 and hence to the Internet 211.

So configured, each of these appliances can communicate information regarding itself by communicating via its particular protocol to its corresponding gateway, the latter then translating that information into an IP-friendly communication that can be communicated to a given desitination via the Internet 211. Via a similar process in reverse, these appliances can receive information (such as, for example, an instruction to be carried out by the appliance).

Returning again to FIG. 1, an Internet-capable end-user device 110 has the ability to communicate with such appliances via IP when connected to the Internet 108. Such an end-user device 110 can comprise a desktop computer or the like that connects to the Internet 108 via a wireline connection. For many purposes, however, this end-user device can comprise a portable two-way communications device such as a cellular telephone (including so-called smart phones). These teachings will also accommodate any number of other enabling platforms, however, including tablet computers (such as the iPad), laptop computers, and so forth.

Figure 3:
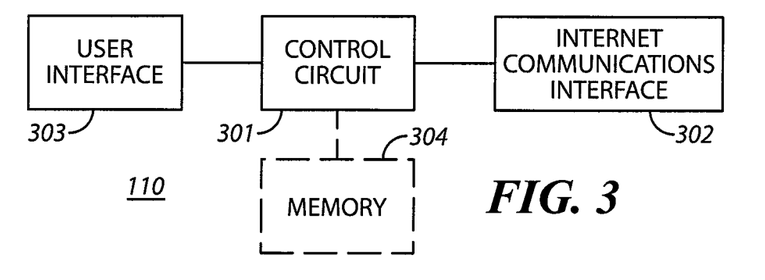
FIG. 3 comprises a block diagram as configured in accordance with various embodiments of the invention.

Referring momentarily to FIG. 3, such an end-user device 110 can generally comprise a control circuit 301 that operably couples to an Internet communication interface 302 and a user interface 303. Such a control circuit 301 can comprise a fixed-purpose hard-wired platform or can comprise a partially or wholly-programmable platform. These architectural options are well known and understood in the art and require no further description here. This control circuit 301 is configured (for example, by using corresponding programming as will be well understood by those skilled in the art) to carry out one or more of the steps, actions, and/or functions described herein.

The end-user device 110 can further comprise, if desired, a memory 304. This memory 304 may be integral to the control circuit 301 or can be physically discrete (in whole or in part) from the control circuit 301 as desired. This memory 304 can also be local with respect to the control circuit 301 (where, for example, both share a common circuit board, chassis, power supply, and/or housing) or can be partially or wholly remote with respect to the control circuit 301 (where, for example, the memory 304 is physically located in another facility, metropolitan area, or even country as compared to the control circuit 301).

This memory 304 can comprise a digital storage media that serves, for example, to non-transitorily store computer instructions that, when executed by the control circuit 301, cause the control circuit 301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The aforementioned Internet communication interface 302 comprises a wireline-based interface or a wireless interface as desired. A wireless approach can include any of a wide variety of close range (such as, for example, Bluetooth-compatible communications), mid-range (such as WiFi-compatible communications), or long-range (such as cellular telephony) communications as desired.

The user interface 303 can comprise any of a variety of user-input and user-output mechanisms. Examples include but are not limited to keyboards and keypads, cursor movement devices, active displays of various kinds, speech-recognition inputs, text-to-speech outputs, and so forth. For the sake of illustration this present description will presume this user interface 303 to comprise a touch-screen display.

Figure 4:
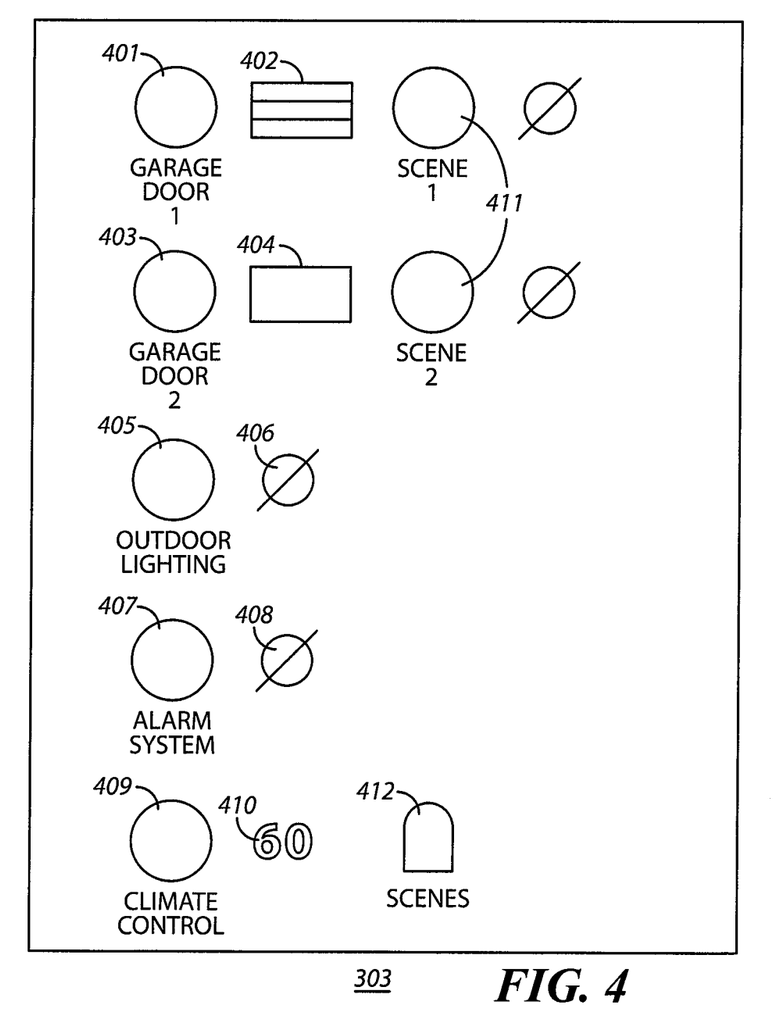
FIG. 4 comprises a top plan schematic representation as configured in accordance with various embodiments of the invention.

So configured, the end-user device 110 permits providing the end user with a shared opportunity to view and interact with a plurality of appliances wherein at least some of the plurality of appliances communicate using incompatible protocols. FIG. 4 provides an illustrative example in these regards.

In the example of FIG. 4 the user interface 303 of the end-user device 110 presents, in common with one another, a number of control button and status icons for a variety of residential appliances as correspond to the example presented above in FIG. 2. These include:

a first control button 401 for a first garage door at the residence 201 along with a corresponding status indicator 402 (indicating, in this example, that this garage door is presently closed);

a second control button 403 for a second garage door at the residence 201 along with a corresponding status indicator 404 (indicating, in this example, that this garage door is presently open);

a third control button 405 for the exterior lighting along with a corresponding status indicator 406 (indicating, in this example, that the exterior lighting is presently switched off);

a fourth control button 407 for the alarm system along with a status indicator 408 (indicating, in this example, that the alarm system is presently switched off); and a fifth control button 409 for the climate control system along with a status indicator 410 (indicating, in this example, that the temperature in the residence 201 is presently 60 degrees Fahrenheit).

By one approach, a dedicated application executed by the end-user device 110 causes the display of such information. Such an application can be serve, for example, to poll the corresponding appliances from time to time (such as every second, every minute, every hour, or such other period of time as may be desired) to obtain such status information. By one approach the control circuit 301 of the end-user device 110 can employ a default polling period while permitting the end user to specify a particular polling period to employ for a particular appliance or for all of the appliances. By another approach, the status information can be pushed to the end-user device 110 without the latter needing to specifically request an update.

The aforementioned control buttons can serve, in turn, to permit the end user to cause an instruction to be sent to the corresponding appliance and/or to bring up further controls to permit such an instruction to be sent. The control button 401 for the first garage door, for example, can send an open/close command that is akin in substance to the open/close command that is sent by a typical hand-held remote control unit for a garage-door opener. As another example, pressing the control button 409 for the climate control system can cause additional controls to be displayed such as a selector switch (to select, for example, "heat," "cool," "fan only," or "off") and a value-increase and value-decrease entry mechanism (to specify, for example, the temperature to be reached and maintained by the system).

So configured, the end user has the benefit of an intuitive presentation of their various appliances without regard to the aforementioned inherent incompatibilities regarding communicating with those appliances. Neither the end user nor the end-user device 110 itself need know anything regarding the communications protocols that are ultimately required to successfully communicate with each of these appliances. Instead, the end user can simply, intuitively, and naturally interact with their appliances as though such limitations did not exist.

As one powerful example in these regards, these teachings will readily support enabling the use of so-called home-automation scenes that specify and coordinate the synchronized actions of a plurality of appliances. By way of illustration, FIG. 4 depicts two scene control buttons 411 (with their corresponding status indicators) denoted as "scene 1" and "scene 2." Asserting the "scene 1" control button, for example, could cause garage door 1 to be closed, the alarm system set to "on," and the climate control temperature to be set to 55 degrees whereas asserting the "scene 2" control button could cause garage door 1 to open, the alarm system to be set to "off," and the outdoor lighting to be switched "on." By one approach, this display of information could include a "scenes" control button 412 that, when selected by the end user, brings up a scene-definition wizard or menu to permit the end user to define the various actions and appliances that, together, comprise a particular selectable scene as per the foregoing.

The present teachings facilitate this ability to define a scene and/or to select a scene that makes use of a variety of appliances without any particular notice, concern, or special accommodation for the fact that at least some of the specified appliances may operate using incompatible protocols comparatively speaking.

By one approach the end-user application can communicate more-or-less directly with the aforementioned gateways. By another approach, however, and referring again to FIG. 1, the end-user application can communicate (partially or exclusively in these regards) with one or more middleware platform intermediaries 109. This middleware platform intermediary 109 can comprise, for example, a server that is configured to communicate with one or more of the gateways as well as the end-user application to effect the provision and exchange of instructions and/or status information as described above. (This reference to "middleware platform intermediaries" will be understood to not be referring to routers or the like that simply serve to effect an otherwise end-to-end exchange of information without themselves serving any particular substantive information-management role.)

By one approach, if desired, the various gateways as comprise a given facility can each communicate with a separate corresponding middleware platform intermediary 109. This can be especially appropriate when the gateway in question utilizes, in addition to IP, other signaling methodologies or components that are more unique and/or proprietary. As but one illustrative example in these regards, a given gateway may communicate using the advanced encryption standard (AES) as promulgated by the National Institute of Standards and Technology rather than the standard Internet-based secure sockets layer (SSL).

So configured, for example, a given middleware platform intermediary 109 can interact with an end-user device 110 to initially register or to otherwise authenticate and arrange for that end-user device 110 to become associated with a given appliance. This might comprise, for example, having the end-user device 110 present a registration opportunity via its user interface 303. This registration opportunity, when selected by the end user, can initiate a registration wizard or otherwise present pre-populated or empty data-entry registration fields. So configured the end-user device 110 could present to the middleware platform intermediary 109 information such as identifiers for the end user and/or the end-user device 110, one or more identifiers for the appliance, authentication information (such as a password, serial number, and so forth), alias information (such as a friendly moniker for the appliance (such as, for example, "window shades in Jim's room"), and so forth. The middleware platform intermediary 109 could then use this information to assess whether the requested communications capability between the end-user device 109 and the specified appliance should be established (based, for example, upon comparison of the received information to the contents of one or more databases and/or upon a real-time vetting of the information with one or more other relevant sources).

Such middleware platform intermediaries 109 can be provided and maintained, for example, by a corresponding service provider 111 who may provide yet other Internet-accessible resources (such as authentication, updates, and billing services). As one example in these regards, the manufacturer of a given line of appliances may provide a corresponding gateway that operates compatibly with those appliances and that is programmed to communicate securely with a specific corresponding middleware platform intermediary 109 that the manufacturer also provides and supports. Such an approach can help, for example, to ensure the integrity of the information flow and help to avoid, for example, an unauthorized person intentionally or unintentionally instructing the end user's garage door to open.

In such a case, of course, the service provider 111 may provide such a capability for a fee. The end user might arrange to pay that fee using a subscription-service model, for example.

These teachings are highly scalable in practice and can readily accommodate essentially any number and/or types of appliances, communication protocols, gateways, and end-user devices and user interfaces. These teachings can also be readily employed in conjunction with many existing appliances and their corresponding gateways and hence can serve to greatly leverage the availability and value of those already-fielded components. These approaches taught herein will also support a wide variety of business models.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   a network communications interface;
   a user interface;
   a memory
   a control circuit operably coupled to the memory, the network communications interface, and the user interface and being configured to:
   present, via the user interface, a shared opportunity to accommodate current information regarding a plurality of residential appliances,
      wherein the current information is received over the internet by the network communications interface from a middleware platform intermediary that received the information over the internet from the plurality of residential appliances through at least two gateway devices,
      wherein a first of the at least two gateway devices communicates with at least a first one of the plurality of residential appliances according to a first protocol and transmits information from the first one of the plurality of residential appliances to the middleware platform intermediary using a common communication protocol different from the first protocol,
      wherein a second of the at least two gateway devices communicates with at least a second one of the plurality of residential appliances according to a second protocol that is incompatible with the first protocol and transmits information from the second one of the plurality of residential appliances to the middleware platform intermediary using that common communication protocol, which is different from the second protocol,
   present, via the user interface, a scene-definition wizard;

receive, via the scene-definition wizard, user input defining a scene, wherein the scene defines actions for two or more of the plurality of residential appliances when activated; and in response to receiving the user input defining a scene, send a scene communication over the internet to the middleware platform intermediary, which converts the scene communication into instructions for the two or more of the plurality of residential appliances and sends the instructions to the two or more of the plurality of residential appliances over the internet, wherein a first set of the instructions is sent over the internet to the first of the at least two gateway devices using the common communication protocol in response to which the first of the at least two gateway device converts the first set of the instructions into the first protocol and sends the first set of the instructions using the first protocol to the first one of the plurality of residential appliances to effect a setting of the first one of the plurality of residential appliances, and wherein a second set of the instructions is sent over the internet to the second of the at least two gateway devices using the common communication protocol in response to which the second of the at least two gateway device converts the second set of the instructions into the second protocol and sends the second set of the instructions using the second protocol to the second one of the plurality of residential appliances to effect a setting of the second one of the plurality of residential appliances.

2. The apparatus of claim 1 wherein the apparatus comprises a portable two-way communications device.

3. The apparatus of claim 2 wherein the portable two-way communications device comprises a cellular telephone.

4. The apparatus of claim 1 wherein the apparatus comprises at least one of:
a cellular telephone;
a tablet computer;
a laptop computer.

5. The apparatus of claim 1 wherein the shared opportunity comprises an application that provides opportunities to a user to transparently interact with the residential appliances notwithstanding the incompatible protocols.

6. The apparatus of claim 1 wherein the current information comprises instructions to be acted upon by at least one of the plurality of residential appliances.

7. The apparatus of claim 1 wherein the current information comprises status information regarding at least one of the plurality of residential appliances.

8. The apparatus of claim 1 wherein the middleware platform intermediary comprises more than one middleware platform.

9. The apparatus of claim 1 wherein the middleware platform intermediary comprises a cloud-based middleware platform intermediary.

10. The apparatus of claim 1 wherein the control circuit is further configured to:
register to establish an authorized basis for communicating with the plurality of residential appliances via the middleware platform intermediary.

11. The apparatus of claim 1 wherein the plurality of residential appliances include at least one:
remotely-controllable light;
movable-barrier operator;
climate-control system;
clothes washer;
dishwasher;
clothes dryer;
fireplace;
stove;
refrigerator;
doorbell/chime;
alarm system;
movable-barrier lock;
pump;
fan;
window covering;
pool component;
hot tub component;
entertainment component.

12. The apparatus of claim 1 wherein the plurality of residential appliances include at least two of:
remotely-controllable light;
movable-barrier operator;
climate-control system;
clothes washer;
dishwasher;
clothes dryer;
fireplace;
stove;
refrigerator;
doorbell/chime;
alarm system;
movable-barrier lock;
pump;
fan;
window covering;
pool component;
hot tub component;
entertainment component.

13. The apparatus of claim 1 wherein one of the plurality of residential appliances is a movable barrier operator.

14. A non-transitory digital storage medium having computer instructions stored therein, the computer instructions, when executed by a computer having a control circuit operably coupled to a memory, a network communications interface, and to a user interface, causing the computer to:
present, via the user interface using the control circuit, a shared opportunity to accommodate current information regarding a plurality of residential appliances and via use of a network connection via the network communications interface,
wherein the current information is received over the internet from a middleware platform intermediary that received the information over the internet from the plurality of residential appliances through at least two gateway devices;
wherein a first of the at least two gateway devices communicates with at least a first one of the plurality of residential appliances according to a first protocol and transmits information from the first one of the plurality of residential appliances to the middleware platform intermediary using a common communication protocol different from the first protocol,
wherein a second of the at least two gateway devices communicates with at least a second one of the plurality of residential appliances according to a second protocol that is incompatible with the first protocol and transmits information from the second one of the plurality of residential appliances to the middleware platform intermediary using that common communication protocol, which is different from the second protocol;

present, via the user interface using the control circuit, a scene-definition wizard;

receive, via the scene-definition wizard, user input defining a scene, wherein the scene defines actions for two or more of the plurality of residential appliances when activated; and in response to receiving the user input defining a scene, send a scene communication via the network communications interface over the internet to the middleware platform intermediary, which converts the scene communication into instructions for the two or more of the plurality of residential appliances and sends the instructions to the two or more of the plurality of residential appliances over the internet, wherein a first set of the instructions is sent over the internet to the first of the at least two gateway devices using the common communication protocol in response to which the first of the at least two gateway device converts the first set of the instructions into the first protocol and sends the first set of the instructions using the first protocol to the first one of the plurality of residential appliances to effect a setting of the first one of the plurality of residential appliances, and wherein a second set of the instructions is sent over the interne to the second of the at least two gateway devices using the common communication protocol in response to which the second of the at least two gateway device converts the second set of the instructions into the second protocol and sends the second set of the instructions using the second protocol to the second one of the plurality of residential appliances to effect a setting of the second one of the plurality of residential appliances.

15. The non-transitory digital storage medium of claim 14 wherein the shared opportunity comprises an application that provides opportunities to a user to transparently interact with the residential appliances notwithstanding the incompatible protocols.

16. The non-transitory digital storage medium of claim 15 wherein the shared opportunity further accommodates forming appliance-control scenes using the residential appliances that communicate using incompatible protocols.

17. The non-transitory digital storage medium of claim 14 wherein the current information comprises instructions to be acted upon by at least one of the plurality of residential appliances.

18. The non-transitory digital storage medium of claim 14 wherein the current information comprises status information regarding at least one of the plurality of residential appliances.

19. The non-transitory digital storage medium of claim 14 wherein the network connection comprises, at least in part, an Internet connection.

20. The non-transitory digital storage medium of claim 14 wherein the network connection includes connection to the middleware platform intermediary.

21. The non-transitory digital storage medium of claim 14 wherein the first of the at least two gateway devices communicates with at least the first one of the plurality of residential appliances according to the first protocol, and wherein the second of the at least two gateway devices communicates with at least the second one of the plurality of residential appliances according to the second protocol that is incompatible with the first protocol.

* * * * *

UNITED STATES PATENT AND TRADEMARK OFFICE
CERTIFICATE OF CORRECTION

PATENT NO.        : 9,698,997 B2
APPLICATION NO.   : 13/324291
DATED             : July 4, 2017
INVENTOR(S)       : Alonso Arteaga-King et al.

It is certified that error appears in the above-identified patent and that said Letters Patent is hereby corrected as shown below:

In the Claims

Claim 14, Column 11, Line 25; delete "interne" and insert -- internet --, therefor.

Signed and Sealed this
Nineteenth Day of December, 2017

Joseph Matal
*Performing the Functions and Duties of the
Under Secretary of Commerce for Intellectual Property and
Director of the United States Patent and Trademark Office*